United States Patent [19]

Masciarelli

[11] Patent Number: 4,660,994
[45] Date of Patent: Apr. 28, 1987

[54] ANTI-FRICTION ELEMENT

[76] Inventor: Camillo Masciarelli, 415 Berlin Rd., Marlboro, Mass. 01752

[21] Appl. No.: 855,495

[22] Filed: Apr. 23, 1986

[51] Int. Cl.⁴ .................. F16C 29/04; B60B 33/08; B65G 13/00
[52] U.S. Cl. ........................................... 384/49; 16/26; 193/35 MD
[58] Field of Search ........... 193/35 MD, 35 SS, 35 A, 193/35 B, 35 C, 35 TE; 384/49, 490, 491, 100, 99; 16/24–27, 18 R; 280/79.1 R; 414/676, 535

[56] References Cited

U.S. PATENT DOCUMENTS

| | | |
|---|---|---|
| 1,014,582 | 1/1912 | Eichholz . |
| 2,490,879 | 12/1949 | Milich . |
| 2,671,242 | 3/1954 | Lewis ................................. 16/26 X |
| 3,011,665 | 12/1961 | Wise . |
| 3,094,223 | 6/1963 | Smith . |
| 3,139,676 | 7/1964 | Grover . |
| 3,235,098 | 2/1966 | Emrick . |
| 3,456,481 | 7/1969 | Zeitlin ................................. 72/446 |
| 4,060,252 | 11/1977 | Mowery ........................ 280/79.1 R |
| 4,108,455 | 8/1978 | James .................................. 16/26 X |
| 4,152,978 | 5/1979 | Abe et al. .............................. 100/35 |
| 4,205,740 | 6/1980 | Hammond ........................ 193/35 A |
| 4,301,673 | 11/1981 | Yonezawa ............................. 72/448 |
| 4,347,794 | 9/1982 | Nordström ............. 193/35 MD X |
| 4,459,909 | 7/1984 | Tagaki ................................. 100/295 |
| 4,553,795 | 11/1985 | Tagaki ................................. 384/49 |

FOREIGN PATENT DOCUMENTS

| | | | |
|---|---|---|---|
| 2152430 | 12/1977 | Fed. Rep. of Germany | 193/35 MD |
| 583053 | 12/1977 | U.S.S.R. | 193/35 MD |
| 836405 | 6/1981 | U.S.S.R. | 384/100 |

Primary Examiner—Stuart S. Levy
Assistant Examiner—Thomas R. Hannon
Attorney, Agent, or Firm—Blodgett & Blodgett

[57] ABSTRACT

Ball element for use in material handling equipment in which a rotatable ball is movable by a pneumatic piston from a first to a second position relative to a friction surface.

7 Claims, 5 Drawing Figures

ANTI-FRICTION ELEMENT

BACKGROUND OF THE INVENTION

There are many situations in the design of material handling equipment, such as conveyors, work benches, work stations, carts, feed stations, or the like in which it is desirable to be able to use ball-type anti-friction elements to provide for change of direction of an object moving along the conveyor or to provide a table on which the object can be moved and rotated to a desired orientation. Such elements have been provided in the past only as part of a complex mechanism that was especially designed for a particular application. Such mechanisms have been expensive and tend to interfere with the operation, for instance, of the drive belt of a roller-type conveyor. Furthermore, they usually extended vertically to a considerable extent, thus interfering, for instance, with their use as part of a table or, as has been stated previously, interfering with the mechanism underlying a roller-type conveyor or the legs of personnel seated before a table. Many of these mechanisms involve exposed moving elements which could be dangerous to personnel working around the conveyor work benches, etc. These and other difficulties experienced with the prior art devices have been obviated in a novel manner by the present invention.

It is, therefore, an outstanding object of the invention to provide anti-friction elements for use in designing equipment of various kinds and capable of many applications.

Another object of this invention is the provision of a friction element which permits the construction or retro-fitting of inexpensive work tables, benches, or conveyors or transfer tables.

A further object of the present invention is the provision of anti-friction elements which are short in the vertical direction, so that they do not interfere with other mechanisms in the vicinity, such as the drive mechanisms for a conveyor or with the legs of personnel seated before a table.

It is another object of the instant invention to provide an anti-friction element which can be readily fabricated from readily-available materials, which is simple in construction, and which is capable of a long life of useful service with a minimum of maintenance.

A still further object of the invention is the provision of an anti-friction element having a retractable ball which is not dangerous to operating personnel and which can be maintained substantially free of dust and other damaging particles.

With these and other objects in view, as will be apparent to those skilled in the art, the invention resides in the combination of parts set forth in the specification and covered by the claims appended hereto.

SUMMARY OF THE INVENTION

In general, the invention consists of an anti-friction element having a main body with a first bore entering one surface and a second bore concentric with but non-coextensive with the first bore. A piston is slidable in the second bore and has a stem whose free end is slidable in the first bore. The stem carries a ball which is rotatable on a nest of secondary balls in a cavity in the free end of the stem. The piston and the stem are movable from a first position in which the ball lies substantially within the first bore below the friction element to a second position in which the ball protrudes from the first bore above the friction elements. Means is provided for introducing fluid under pressure to the second bore to move the piston and to carry the ball to the said second position. Means located in the second bore is provided to bias the piston to normally maintain the piston and the ball in the said first position.

Most specifically, the anti-friction element is provided with a top wall having an integral tubular portion extending from its inner surface and having an extension of the said small bore. A spring extends between the inner surface of the top wall and a facing surface of the piston.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
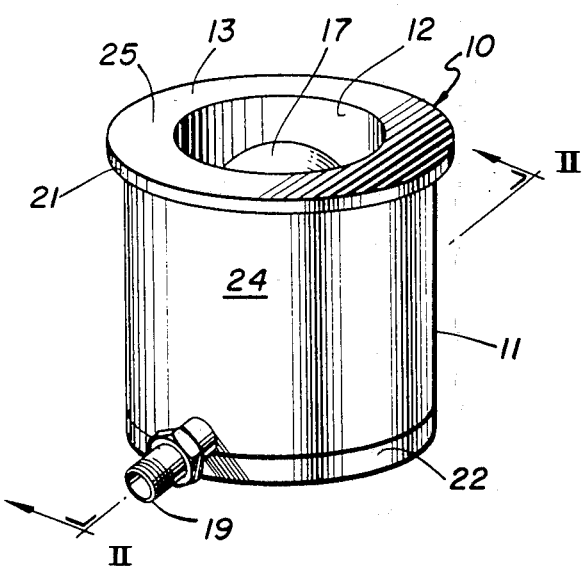
FIG. 1 is a perspective view of an anti-friction element embodying the principles of the present invention.
Figure 2:
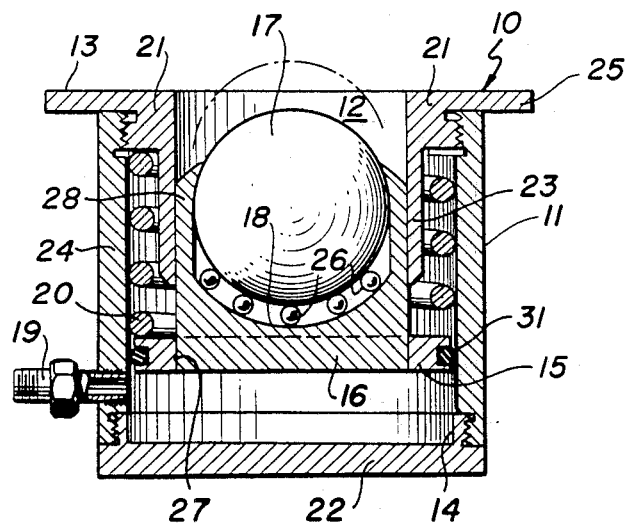
FIG. 2 is a vertical sectional view of the element taken on the line II—II of FIG. 1.

Referring to FIGS. 1 and 2, which best show the general features of the invention, the anti-friction element, indicated generally by the reference numeral 10, is provided with a main body 11, having a first bore 12 entering one surface 13. The main body also has a second bore 14 which is concentric with the first bore. A piston 15 is slidable in the second bore 14 and is provided with a stem 16. This stem extends from one side of the piston and has a free end which is slidable in the first bore 12. The stem 16 carries a primary ball 17 which is rotatable in a recess or cavity 18 that is formed in the said free end of the stem. The piston 15 and the stem 16 are movable as a unit from a first position in which the ball 17 lies substantially entirely within the first bore 12 to a second position in which the ball protrudes from the first bore. Means, including a connector 19, is provided for introducing fluid (such as air under pressure) to the second bore 14 to move the piston to carry the ball to the said second position. Means, such as a spring 20, is located in the second bore to bias the piston to normally maintain the piston and the ball in the said first position.

The main body 11 is provided with a tubular portion 24 which has the large second bore 14. The tubular portion is closed at one end by a top wall 21 and closed at the other end by a bottom wall 22. The top wall has the small first bore 12 opening on its outer surface 13. The top wall also has an integral tubular portion 23 extending from its inner surface and having a bore which is an extension of the first small bore 12. The spring 20 extends between the inner surface of the top wall 21 and the facing surface of the piston 15.

The top wall 21 is provided with a flange 25 which extends radially from the outer surface of the tubular portion for flange mounting and to provide a substantial friction surface 13. The connector 19 is mounted in the wall of the tubular portion 24. The piston 15 is provided with a seal such as an O-ring 31. The cavity 18 in the upper end of the stem 16 envelopes more than one half of the primary ball 17 and is provided with small bearing balls 26 against which the primary ball resides.

In the version of the invention shown in FIG. 2, the stem 16 and the piston 15 are formed as separate members that are joined together by a press fit 27. The recess or cavity 18 in the stem is formed by a tubular upper end which is deformed around the ball after the ball has been inserted. This could be accomplished by use of a locking ring or a snap fit, also. The tubular portion 23 of the top wall acts to limit movement of the piston to limit the amount that the ball can protrude from the first bore 12.

The top wall 21 is separate from and threadily engaged with one end of the tubular portion 24 and the bottom wall 22 is separate from and threadily engaged with the other end of the tubular portion. The connection between the top wall and the tubular portion 24 can be accomplished, also, by swagging, staking, or welding. The recess in the stem is formed with a elliptical or angular bottom surface 18 that is lined with the small balls 26 to form an anti-friction layer that is concentric or at angle with the primary ball 17.

Figure 3:
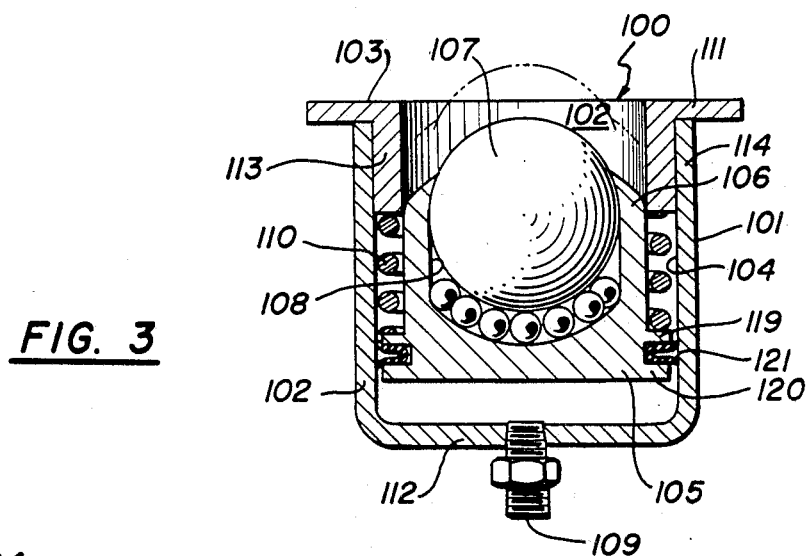
FIG. 3 is a vertical sectional view of a modified form of the anti-friction element.
Figure 4:
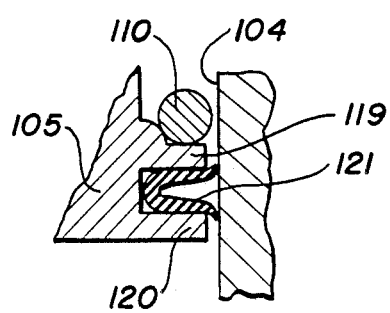
FIG. 4 is an enlarged view of a portion of the element shown in FIG. 3.

Referring to FIGS. 3 and 4, which shows a modification of the invention, it can be seen that the anti-friction element, indicated by the reference numeral 100, consists of a main body 101, having a tubular portion 113 with a small first bore 102 entering from a top surface 103. The main body consists of a tubular portion 114 with a second bore 104 extending through it. This tubular portion is closed at one end by the top wall 111 and closed at the other end by a bottom wall 112. The top wall has the first bore 102 extending through it and opening on its outer surface 103. The top wall has an integral tubular portion 113 extending from its inner surface having a bore which is an extension of the small bore 102. A piston 105 is slidable in the large bore 104 and has a cylindrical stem 106 which is slidable in the small bore 102. A primary ball 107 is rotatably mounted in the stem 106 concentrically of the small bore and resides in a cavity 108 formed in the stem. A coil spring 110 extends between the end of the tubular portion 113 of the top wall and a facing surface of the piston 105. A connector 109 is provided for introducing pressure air into the main body between the bottom wall 112 and the piston 105 to move the piston, so that the ball protrudes out of the small bore.

The piston 105 and the stem 106 are integral and the stem and the piston have the same cylindrical outer surface. The piston has two spaced radial flanges 119 and 120 between which lies a U-type seal 121 whose flexible element engages the surface of the second bore 104.

Figure 5:
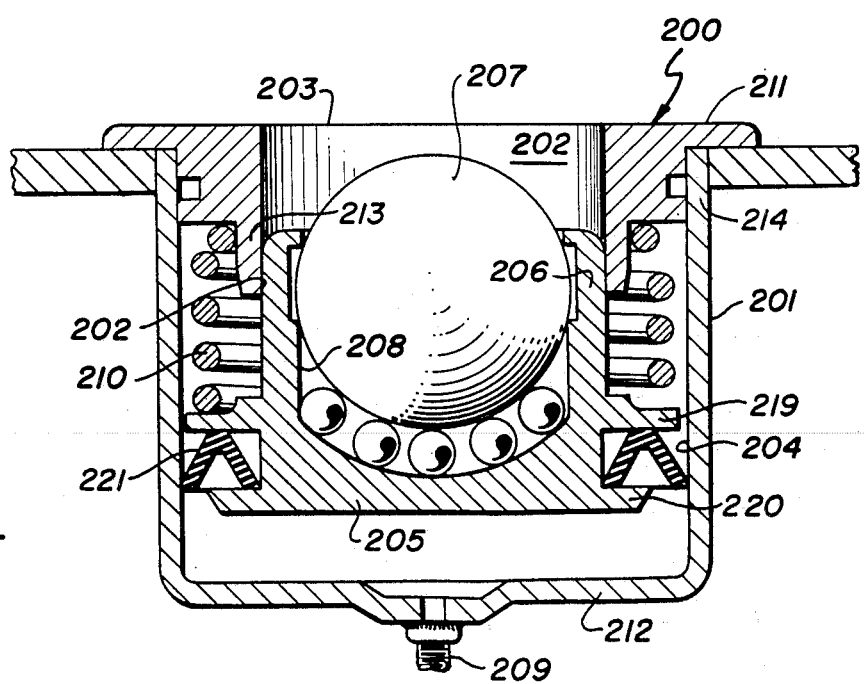
FIG. 5 is a vertical sectional view of another form of the invention.

Referring to FIG. 5, which shows a further modification of the invention, it can be seen that the anti-friction element, indicated by the reference numeral 200, consists of a main body 201, having a tubular portion 213 with a small first bore 202 entering from a top surface 203. The main body consists of a tubular portion 214 with a second bore 204 extending through it. This tubular portion is closed at one end by the top wall 211 and closed at the other end by a bottom wall 212. The top wall has the first bore 202 extending through it and opening on its outer surface 203. The top wall has the integral tubular portion 213 extending from its inner surface having a bore which is an extension of the small bore 202. A piston 205 is slidable in the large bore 204 and has a cylindrical stem 206 which is slidable in the small bore 202. A primary ball 207 is rotatably mounted in the stem 206 concentrically of the small bore and resides in a cavity 208 formed in the stem. A coil spring 210 extends between the top wall 211 and a facing surface of the piston 205. A connector 209 is provided for introducing pressure air into the main body between the bottom wall 212 and the piston 205 to move the piston, so that the ball 207 protrudes out of the small bore and above the surface 203.

The piston 205 and the stem 206 are integral. The piston has two spaced radial flanges 219 and 220 between which lies a U-type seal 221 whose flexible element engages the surface of the second bore 204.

It can be seen by observing FIG. 2 that the anti-friction element is relatively short in the vertical direction and can be used in a variety of situations where length would be a problem. When air is introduced through the connector 19, the pressure pushes the piston 15 upwardly carrying the stem 16 with it. The stem slides smoothly in the small bore 12 and the movement in this way raises the primary ball 17 upwardly till it occupies the illustrated dotted position above the surface 13. When the air pressure is removed from the connector 19, the spring 20 presses the piston downwardly by extending between the inner surface of the top wall 21 and the upwardly-facing surface of the piston 15. The O-ring 31 serves to prevent leakage of the air, so that the full pressure of the air acts on the ball. The load placed on the upper portion of the ball 17 acts against the small bearing balls 26 which underlie it. This means that the weight of the load that can be carried by the anti-friction element is determined and limited by the forces which can be used against these balls. The nature of the anti-friction element, however, is by selecting the air pressure properly, any excess load (that would be damaging to the weakest part of the element) will cause the ball to sink back into the first bore 12 and cause the load to contact the upper surface 13. In this way, the bearing balls 26 will not be damaged.

The advantages of the present invention will be readily apparent from an examination of the construction shown in the drawings. Because of the low vertical height, it is possible to use the anti-friction elements in situations where there are underlying mechanical elements, as in the drive belt of a roller-type conveyor. Another such situation exists where the anti-friction element is to be used with a number of others to provide a table on which an article which is being worked on can be oriented. If the personnel is seated before the table with his legs under the table, a vertically-elongated element would interfere with his legs and prevent him from moving freely while working on the article. Also, it would prevent the installation of work station components at that position, such as drawers, etc.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Anti-friction element, comprising:
(a) a main body having a first bore entering one friction surface and a second bore concentric with the first bore, (b) a piston slidable in the second bore, (c) a stem extending from one side of the piston and slidable in the first bore, the stem carrying a ball which is rotatable in a cavity in the stem, the piston and stem being movable from a first position in which the ball lies substantially entirely within the first bore below the said friction surface to a second position in which the ball protrudes from the first bore above the said friction surface, (d) means for introducing fluid under pressure to the second bore to move the piston and carry the ball to the said second position, and (e) means located in the second bore to bias the piston to normally maintain the piston and the ball in the said first position.

2. Anti-friction element, comprising:

(a) a main body having a tubular portion with a large bore which is closed at one end by a top wall and which is closed at the other end by a bottom wall, the top wall having a small bore extending therethrough opening on its outer surface, the top wall having an integral tubular portion extending from its inner surface and having an extension of the small bore, (b) a piston slidable in the large bore and having a cylindrical stem slidable in the small bore, (c) a primary ball rotatably mounted in the stem concentrically of the small bore, (d) a spring extending between the inner surface of the top wall and the facing surface of the piston, and (e) means for introducing pressure air into the main body between the bottom wall and the piston to move the piston, stem, and ball, so that the ball protrudes out of the small bore.

3. Anti-friction element as recited in claim 2, wherein the top wall is provided with a flange which extends radially from the outer surface of the tubular portion, wherein the said means is a pressure hose connection that is mounted in the wall of the tubular portion, wherein the piston is provided with an O-ring which engages the surface of the large bore, wherein the spring is a coil spring lying along the surface of the large bore, and wherein a recess in the stem envelopes more than one-half of the primary ball and is provided with small bearing balls against which the said primary ball resides.

4. Anti-friction element as recited in claim 3, wherein the recess in the stem is formed with a formed bottom surface that is lined with the small balls to form an anti-friction layer that is generally concentric with the primary ball.

5. Anti-friction element as recited in claim 2, wherein the stem and the piston are formed as separate members that are locked together, wherein the recess in the stem is formed as a tubular upper end which is deformed around the ball after the ball has been inserted, and wherein the tubular portion of the top wall acts to limit movement of the piston to limit the amount that the ball can protrude from the small bore.

6. Anti-friction element a recited in claim 2, wherein the top wall is separate from and engaged and locked with one end of the tubular portion, and wherein the bottom wall is separate from and threadedly engaged with the other end of the tubular portion.

7. Anti-friction element as recited in claim 2, wherein the piston and stem are integral, wherein the stem and piston have the same cylindrical outer surface, wherein the piston has two spaced radial flanges with a seal lying between the flanges and engaging the surface of the second bore, and wherein the spring extends between the end of the tubular portion of the top wall and a facing surface of one of the flanges of the piston.

* * * * *